Patented Nov. 7, 1939

2,178,821

UNITED STATES PATENT OFFICE 2,178,821

TOOTH FILLING

William G. Turner, Brooklyn, N. Y.

No Drawing. Application November 9, 1937,
Serial No. 173,703

1 Claim. (Cl. 106—6)

This invention relates to a class of dental materials, and has for its object to provide a form of filling designed to be employed in cavities of the teeth of persons to prevent the admission of air, moisture and foreign substances during periods when the teeth are undergoing treatment, as well as serving advantageously as a toothache remedy, the invention contemplating the provision of a filling mainly for temporary rather than for permanent use. The invention consists essentially of providing an absorbent fibrous filling material which is impregnated with a cementitious material containing an anesthetic and adapted to solidify when contacted with water so that the fibrous material on being packed in the cavity of a tooth will solidify and harden when subjected to water taken in the mouth of the person by the solidification of the cementitious material.

Other objects of the invention are to provide the cementitious material in liquid form so that the fibrous material and the liquid may be kept separately and employed by being combined at the time of filling the cavity; and to provide if desired an antiseptic in the liquid for serving as a germicide for diseased teeth.

In practice my dental filling is provided by employing a fibrous material, such as absorbent cotton of sufficient quantity when firmly packed to fill the cavity of a tooth. Prior to packing the absorbent fibrous filling, the portion selected for use is impregnated with a cementitious material adapted to solidify and harden when contacted by water. This cementitious material is preferably used in a liquid form, and while a number of various well known vegetable gums may be employed, I prefer to use gum sandarac, three pounds and gum camphor, two ounces. These ingredients are dissolved in approximately one-half gallon of alcohol in a suitable container. In conjunction with these ingredients I may also employ an antiseptic, such as two ounces of methyl salicylate which is dissolved in the alcohol with the sandarac and camphor. To the above I add a substance possessing anesthetic properties, such as thymol, in the amount of two ounces in crystalline form, the crystals being also dissolved in the alcohol with the other above-mentioned ingredients.

This liquefied cementitious material is ordinarily kept separate from the absorbent fibrous material, and when a cavity of a tooth is filled the required portion of the material is thoroughly saturated with the liquid. By the use of a suitable implement the saturated filler is packed tightly in the cavity of the tooth, and the filling on being subjected to water by the person holding a quantity in the mouth will neutralize the solvent action of the alcohol to cause the sandarac and camphor to solidify and harden to a degree for effectually serving mainly as a temporary filling. The filling when hard will be practically impervious to moisture and the admission of air into the cavity for tending to prevent aching of the tooth from an exposed nerve or exposed sensitive dentine, and the methyl salicylate will serve as an antiseptic remedy for tendency of the tooth structure to decay. The thymol will exert an immediate and temporarily durable anesthetic effect to stop aching of the tooth. Thus a simple and efficient filling is provided for the cavitous teeth of persons, especially when aching from exposure, and which may be advantageously employed for teeth when undergoing treatment.

In the foregoing description, I have embodied the preferred form of my invention, but I do not wish to be understood as limiting myself to the exact formula of the liquid cementitious material herein designated as I am aware that other ingredients may be substituted for one or a number of them, or the same ingredients in varying proportions; therefore I reserve to myself the right to make such changes as fairly fall within the spirit of the invention.

Having thus described my invention, I claim as new and desire to secure by Letters Patent:

In a tooth filling, a liquefied cementitious material for saturating a fibrous filling whereby the filling will solidify and harden when subjected to water, consisting of the following ingredients in the proportionate amounts named: gum sandarac, three pounds, gum camphor, two ounces; methyl salicylate, two ounces; crystalline thymol, two ounces; all dissolved in one-half gallon of alcohol.

WILLIAM G. TURNER.